United States Patent [19]
Clark

[11] Patent Number: 5,086,296
[45] Date of Patent: Feb. 4, 1992

[54] SIGNAL GENERATING DEVICE

[75] Inventor: David G. Clark, Redhill, England

[73] Assignee: U.S. Philips Corporation, New York, N.Y.

[21] Appl. No.: 279,389

[22] Filed: Dec. 2, 1988

[30] Foreign Application Priority Data

Dec. 2, 1987 [GB] United Kingdom ............... 8728141

[51] Int. Cl.⁵ ............................................. G05G 9/04
[52] U.S. Cl. .................................. 340/709; 340/706; 338/128
[58] Field of Search .................. 340/709, 710, 706; 338/128; 74/471; 178/18, 19, 20

[56] References Cited

U.S. PATENT DOCUMENTS

| | | | |
|---|---|---|---|
| 3,701,963 | 10/1972 | Kasazima | 338/138 |
| 4,459,578 | 7/1984 | Sava et al. | 338/128 |
| 4,692,756 | 9/1987 | Clark | 340/709 |
| 4,782,327 | 11/1988 | Kley et al. | 341/20 |

FOREIGN PATENT DOCUMENTS 2076602 12/1981 United Kingdom .
2142711 1/1985 United Kingdom .

Primary Examiner—Alvin Oberley

[57] ABSTRACT

An X-Y signal generating device comprises two belts (11,11') extending between and around two pairs of rollers (12,13) and (12',13'). One band moves in the X-direction and one in the Y-direction, and one band is located inside the other. The rollers are mounted on a common block (14). Each band has a strengthened section (17,17') with a slot (18,18') in it. An actuating key (21) is located at the crossover point of the two slots and may be moved freely in any direction, within limits, causing proportionate movement of the two bands around the rollers. XY control signals can be derived independently from the movement of the bands. The XY control signals can be produced by providing the bands with combined resistive/conductive surfaces and using conductive rollers to pass a current through the bands.

8 Claims, 2 Drawing Sheets

SIGNAL GENERATING DEVICE

BACKGROUND OF THE INVENTION

This invention relates to manually operable signal generating devices of a type suitable for use as interface devices for generating control signals which can be used to control movement of at least one discrete image portion in a display which is produced on a display device, for instance a television monitor.

Known signal generating devices of the above type are the mouse, the tracker ball and the toggle or joy stick. Each of these known devices can generate control signals for controlling movement of a discrete image portion such that the latter can be positioned anywhere in the display by appropriate manual manipulation of the device. The control signals generated by the device can be considered to be co-ordinate control signals which represent the co-ordinates of XY positions in the display and which are used to drive display circuits to control the movement of the image portion from a current position in the display to a required position.

In a computer-based information display system, there are many instances where interactive operation of the system by a user is based on visual feedback from displayed information. It is well-established that the above-mentioned known signal generating devices can be employed as interface devices to effect such interactive operation, and that the visual feedback from the display to a user obviates the need for the user having to look at such an interface device while operating it.

However, with each of these known signal generating devices the entire hand rather than a single finger has to be used to operate them, which can be a disadvantage when the device forms part of a user control console containing other types of interface device, for instance a keyboard. In particular, the need to engage the device with the entire hand can restrict the speed at which it can be taken into use. Also, a mouse requires a flat surface to run on, a tracker ball is intrinsically large in three dimensions, so that mounting it in a control console can be a problem, whilst the problems of mechanical instability and inaccuracy can arise with a toggle or joy stick.

Applicant's GB patent specification 2 142 711 describes a manually operable signal generating device of the type set forth above which does not suffer from these drawbacks. An actuating part is movable by finger pressure to any position within a substantially planar window area, and is provided on a continuous loop member at least parts of which are flexible such as to be disposed about spaced-apart parallel guide surfaces to allow composite movement of the member along and around the guide surfaces in response to finger pressure signal means responsive to this composite movement to generate control signals. By having an actuating part which requires only finger pressure to move it, the device is simpler and more convenient to use compared with the previously known devices which are operated using the entire hand.

However, unlike the previously known devices, the prior device described in GB 2 142 711 has the limitation that there was no integral switch on the actuating part for XY position selection, and a push-button switch for this purpose was provided as a separate part on the actuating part. It was also found with this prior device that mechanical problems of jamming and backlash could arise.

SUMMARY OF THE INVENTION

In the improved signal generating device of the type set forth above in an integral switch can readily be provided, and the aforesaid mechanical problems are mitigated.

According to the invention, a manually operable signal generating device includes mounting means comprising a first pair of spaced apart parallel guide surfaces and a second pair of spaced apart parallel guide surfaces disposed orthogonally with respect to said first pair. A continuous first loop member defines a first linear slot, at least parts of the first loop member being flexible and located about the first pair of guide surfaces to mount the first loop member on the mounting means. A continuous second loop member defines a second linear slot which is disposed orthogonally with respect to the first slot, at least parts of the second loop member being flexible and located about the second pair of guide surfaces to mount the second loop member on the mounting means. One of the first and second loop members is positioned inside the other. An actuating part located in both the first and second slots is moved manually to any position within a planar window area to move the first and second loop members in mutually orthogonal directions normal to their respective pairs of guide surface. Signal means responsive to movement of the loop members to generate control signals.

The first and second linear slots may extend parallel to the first and second pairs of guide surfaces, respectively.

The first and second guide surfaces may be constituted by first and second pairs of rollers which are mounted for axial rotation on a generally rectangular support block.

Each loop member is preferably a wholly flexible belt which is close-fitting about the respective pair of rollers. Each belt can be elastic to keep it under tension about the respective pair of rollers. Alternatively, or additionally, the rollers of the respective pair for each belt can be spring-mounted to facilitate keeping the belt under tension about these rollers.

As regards the signal means, each loop member may comprise a resistive coating on its inner surface along approximately half its length and a conductive coating on its inner surface along substantially the remainder on its length, with both pairs of rollers being electrically conductive and a signal generator being connected across the rollers of each pair and being responsive to produce control signals in accordance with the instantaneous resistance that exists between each pair of rollers.

The actuating part preferably includes a key switch having contacts which are slidably connected to the conductive coatings on the two bands to provide electrical connection thereto through the rollers, one from each pair, around which these conductive coatings pass and are always in engagement with.

DETAILED DESCRIPTION

Figure 1:
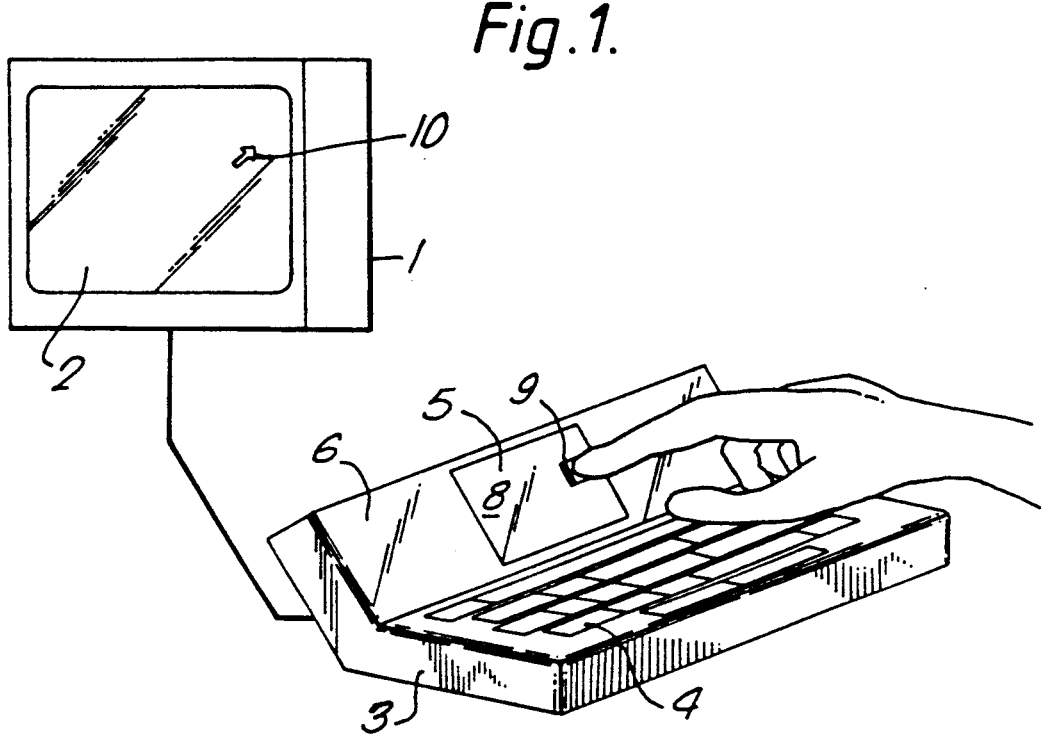
FIGS. 1 and 2 show diagrammatically display apparatuses comprising respective forms of control console and an associated display device.
Figure 2:
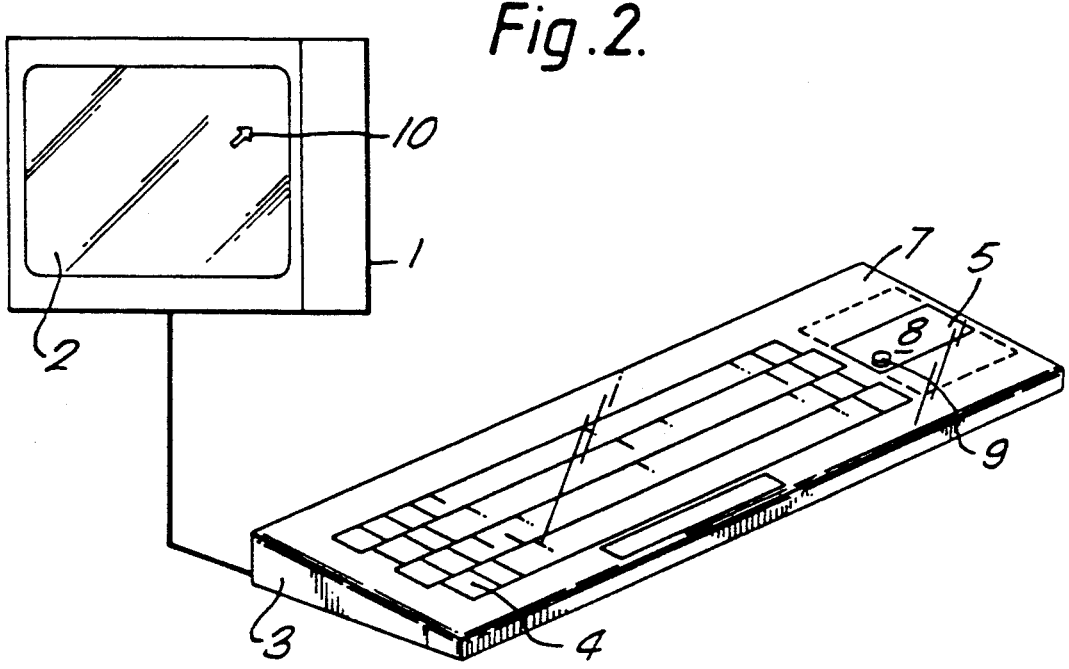

FIGS. 1 and 2 show a television monitor 1 having a display screen 2, and a remote control console 3. The control console 3 is assumed to contain micro-computer or video game circuitry which is accessed by a keyboard 4. There is also provided on the control console 3 as a second interface device, a signal generating device 5 in accordance with the invention. In FIG. 1, this device 5 is located at the centre of a sloping panel 6 behind the keyboard interface 4: in FIG. 2 it is located at the side of the keyboard 4 in the top panel 7.

The signal generating device 5 has a planar window area 8 which is defined by an aperture in the panel 6 or in the panel 7, as the case may be. An actuating key 9 of the device 5 can be engaged by a finger, as illustrated in FIG. 1, so as to be moved by pressure to any position within the area 8. The movement of the actuating key 9 is composite movement made up of reciprocal movement in orthogonal directions. As will be described presently, the movement of the actuating key 9 results in the production of co-ordinate XY control signals which represent the XY co-ordinates of the position of the actuating key 9 within the area 8. These control signals can be used in conventional ways to drive suitable display circuits for determining the position of an image portion 10 of a display on the display screen 2. For instance, the control signals can be produced continually during movement of the actuating key 9 to control the positioning of a cursor on the display screen, or to control movement of an element of a video game display. Alternatively, the control signals can be used to control a graphics input onto the display screen 2 in a manner analogous to such control as effected by an electronic "writing tablet". Another possible use is one which is analogous to touch selection of a displayed item as afforded by a touch-sensitive screen which overlays a display screen. For this latter use, a cursor would be moved to a selected position which is then "touch-selected", for instance by operating a switch provided integrally in the actuating key 9, as will also be described. Such an integral switch can also be used to determine the start and finish of a graphics input. By reason of its single finger operation, the device 5 is extremely compatible for use with a keyboard interface, because it can be operated with very little movement of the hand from a normal typing position.

Figure 3:
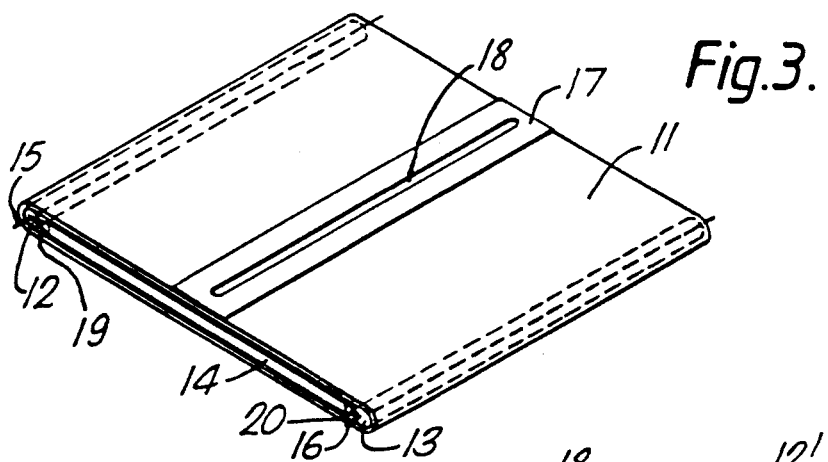
FIGS. 3, 4 and 5 show diagrammatically a particular construction of signal generating device according to the invention.
Figure 4:
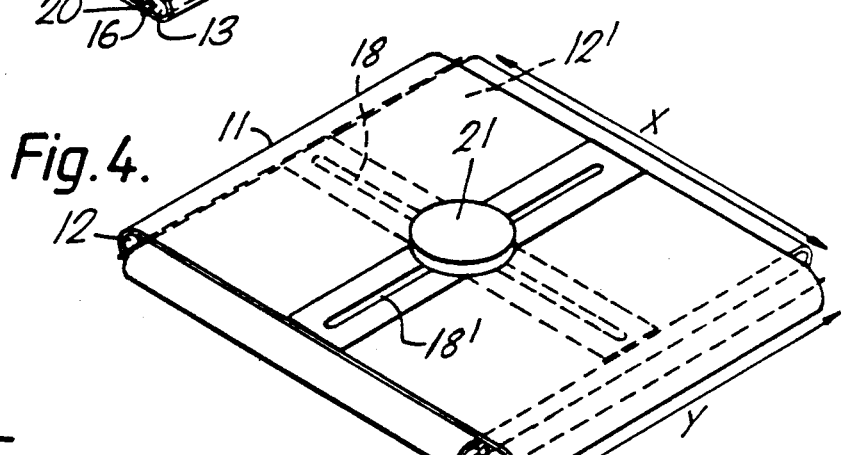
Figure 5:
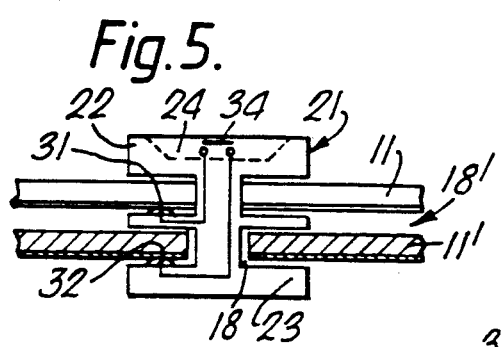

The particular construction of signal generating device shown in FIGS. 3 to 5 includes two belts of flexible material each of which extends between and around two separate rollers. One belt moves in the X direction and one in the Y direction, and one belt is located inside the other. The rollers are mounted on a common block. Each belt has a strengthened section with a slot in it. An actuating key is located at the crossover point of the two slots and is arranged to hold the belts loosely together at this point. The base of the actuating key slides on the top surface of the common block, the materials of the actuating key and/or this surface being such that their friction is fairly small but is the dominant resistance to movement of the actuating key. The actuating key may be moved freely in any direction within limits set by the construction, causing proportionate movement of the two belts around the rollers, from which movement the XY control signals can be derived independently. With suitably light and flexible materials the resistance to motion can be made small and consistent with respect to direction.

The arrangement of each of the two belts is shown in FIG. 3. The belt 11 is a continuous loop member of flexible material located about two spaced rollers 12 and 13 which provide a pair of parallel guide surfaces for the band 1. These two rollers are mounted on a block 14 for rotation about respective central shafts 15 and 16 to permit reciprocal movement of the belt 11 in a direction normal to the longitudinal axes of the rollers 12 and 13. There is includes on the belt 11 a strengthening member 17 in which is provided a slot 18 which also extends through the belt 11. The belt has lateral stabilisation and may be manufactured with ends that join together at the slotted member 17. It is envisaged that co-operating 'snap' actuating portions may be provided at the ends of the belt and on the slotted member 17 to facilitate assembly and replacement. The belt should be kept under tension, and this may be accomplished by 'stretch' in the belt material itself by forming the belt from elastic material, or by spring-mounting the rollers as indicated at 19, 20, or both these means.

FIG. 4 shows diagrammatically the complete device, in which the two belts 11, 11' are arranged one inside the other for their reciprocal movement in orthogonal X and Y directions under the control of an actuating key 21 which is located at the intersection of the slots 18, 18'. FIG. 5 shows a side view of the actuating key which is generally "bobbin-shaped" and has its core extending through the slots 18, 18'. The ends 22 and 23 of the actuating key 21 extend beyond the slots 18, 18' to hold the belts 11, 11' together loosely. Preferably, the actuating key 21 is only a little larger than a normal keyboard key, and slides easily in both the slots 18, 18' without pinching the belts. Also, its ends are wide and flat to minimise any 'tipping' movement as it is moved manually. The upper end of the actuating key 21 has formed on it a finger depression 24 which is deep enough to allow easy movement of the key in all directions without finger slip. A small hole (not shown) may be provided in the centre of the upper end of the key 21 in which a pen or pencil could be inserted: this could provide more accurate motion control for drawing.

As regards the position read-out of the actuating key 21, this may be achieved optically, for instance by providing stripes on the band 11, 11' or vanes attached to the rollers 12, 12' and 13, 13', which periodically interrupt the path between a light sensitive diode and an associated light source as belt movement takes place. However, such optical means increase the complexity of the device and, moreover, do not provide an absolute position indication but only a relative one.

Figure 6:
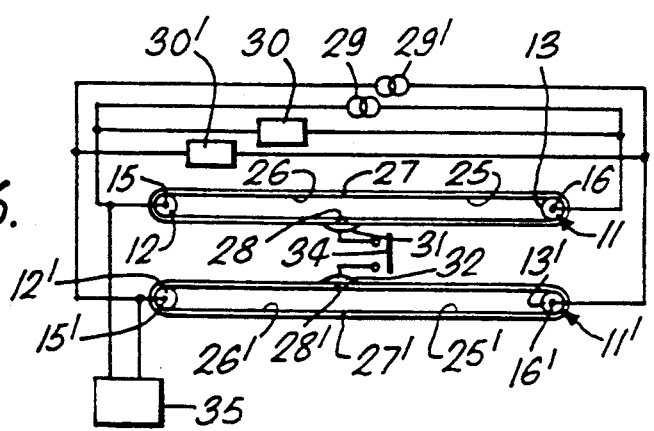
FIG. 6 shows one form of means for producing control signals from the signal generating device shown in FIGS. 3 to 5.

A simple means of providing absolute position read-out is achieved, as illustrated diagrammatically in FIG. 6, by providing a resistive coating 25, 25' on the inner surface of each of the belts 11, 11' along half their lengths and providing a conductive coating 26, 26' on the inner surface of each of the belts 11, 11' along the other half of their lengths. On each belt, the two coatings 25, 26 and 25', 26' are electrically interconnected at their ends 27, 27' and electrically isolated from each other at their ends 28, 28'. Both pairs of rollers and their respective shafts are electrically conductive. The electrical resistance between the two rollers of each of the pairs 12, 13 and 12', 13' is proportional to the position in the X or Y direction, as the case may be, of the slot 18, 18' in the relevant belt 11, 11' as the belt is moved around these two rollers. Passing a small current through this resistance from a current source 29, 29' results in a voltage which can be read using a simple analogue-to-digital converter 30, 30'. The rollers form large area contacts under constant pressure. They can therefore be expected to provide reliable contact to the conductive and resistance coatings. Their conductive shafts 15, 16 and 15', 16' provide a simple means of connection to the external circuitry.

An alternative arrangement, which does not rely on resistive coatings on the belts, is to couple one of the rollers for each belt to a small multi-turn potentiometer the friction of which is low enough not to affect band movement adversely.

An integral key switch in the actuating key 21 is represented diagrammatically in FIGS. 5 and 6. This key switch has contacts 31 and 32 which are slidably connected to the respective conductive coatings 26, 26' on each belt to provide electrical connection to the shafts 15 and 15', via the rollers 12 and 12' around which these conductive coatings pass and are always in engagement with. Operation of a contact 34 of the key switch 21 will complete an electrical connection through roller shafts 15, 15' to external control circuitry 35. The integral key switch must be able to be moved while it is operated. Low friction sliding contacts are therefore provided as the contacts 31 and 32.

Alternatively, the integral key switch can have the contacts (31), (32) provided as fixed contacts to which flexible leads are connected to access the key switch.

An important consideration in the implementation of a device according to the invention is continued operation in the presence of dirt, dust and spills. This is a problem which is shared by other XY control devices: e.g. 'mice' frequently need taking apart for cleaning of the rollers. The resistive conductive coatings are of course protected by being on the underside of the belts. Dirt can be prevented from falling over the sides of the upper belt by 'skirts' of fibres located above the belt and nearly, but not quite, touching it. Dirt falling over the ends is not really a problem. In order to minimise the entry of dirt through the slot 18 in the upper belt, this slot should be made as narrow as possible. It could possibly also be protected with a 'fringe' of fibres.

The foregoing is exemplary and not intended to limit the scope of the claims which follow.

I claim:

1. A manually operable signal generating device for use as an interface device for generating control signals which can be used to control movement of at least one discrete image portion in a display which is produced on a display device, said signal generating device comprising:

mounting means comprising a first pair of parallel guide surface which are spaced apart from each other and a second pair of parallel guide surfaces which are also spaced apart from each other and are disposed orthogonally with respect to said first pair, a continuous first loop member defining a first linear slot, at least parts of said first loop member being flexible and located about said first pair of guide surfaces to mount said first loop member on the mounting means, a continuous second loop member defining a second linear slot which is disposed orthogonally with respect to the first slot, at least parts of said second loop member being flexible and located about said second pair of guide surfaces to mount said second loop member on the mounting means, one of said first and second loop member being positioned inside the other, means defining a substantially planar window, an actuating part which is located in both said first and second slots and thereby coupled to both said first and second loop members, said actuating part being movable to any position within said planar window area and such movement thereof causing composite movement of the first and second loop members in mutually orthogonal direction normal to their respective pairs of guide surfaces, and signal means responsive to movement of the loop members to generate said control signals.

2. A signal generating device as claimed in claim 1, in which said first and second linear slots extend parallel to said first and second pairs of guide surfaces, respectively.

3. A signal generating device as claimed in claim 1 in which said first and second guide surfaces comprise first and second pairs of rollers which are mounted for axial rotation on a generally rectangular support block.

4. A signal generating device as claimed in claim 3, which each of said continuous first and second loop members comprises a wholly flexible band which is close-fitting about the respective pair of rollers.

5. A signal generating device as claimed in claim 4, in which each band is elasticated to keep it under tension about the respective pair of rollers.

6. A signal generating device as claimed in claim 4, in which the rollers of the respective pair for each band are spring-mounted to facilitate keeping the band under tension about these rollers.

7. A manually operable signal generating device for use as an interface device for generating control signals which can be used to control movement of at least one discrete image portion in a display which is produced on a display device, said signal generating device comprising:

mounting means comprising a generally rectangular support block;

a first pair of parallel, electrically conductive rollers mounted for axial rotation on said support block, which rollers are spaced apart from each other, and a second pair of parallel, electrically conductive rollers mounted for axial rotation on said support block, which second pair of rollers are also spaced apart from each other and are disposed orthogonally with respect to said first pair;

a continuous first loop member having a first linear slot therein, at least parts of said first loop member being flexible and located about said first pair of rollers to mount said first loop member on the mounting means, said first loop member having a resistive coating on its inner surface along approximately half its length and a conductive coating on its inner surface along substantially the remainder of its length;

a continuous second loop member having a second linear slot therein, at least parts of said second loop member being flexible and located about said second pair of rollers to mount said second loop members on the mounting means, said second loop member having a resistive coating on its inner surface along approximately half its length and a conductive coating on its inner surface along substantially the remainder of its length, one of said first and second loop members being positioned inside the other;

means defining a substantially planar window;

an actuating part which is located in both said first and second slots and thereby coupled to both said first and second loop members, said actuating part being movable to any position within said planar window area and such movement thereof causing composite movement of the first and second loop members in mutually orthogonal directions normal to their respective pairs of rollers; and a signal generator connected across the rollers of each pair and responsive to produce control signals in accordance with the instantaneous resistance that exists between each pair of rollers.

8. A signal generating device as claimed in claim 6, in which said actuating part comprises a key switch having contacts which are slidably connected to the conductive coatings on the two bands to provide electrical connection thereto through the rollers, one from each pair, around which these conductive coatings pass and continuously engage.

* * * * *